July 7, 1936.  C. P. SORENSEN  2,046,976
LIGHTING SYSTEM FOR VEHICLES
Filed June 19, 1935   3 Sheets-Sheet 1
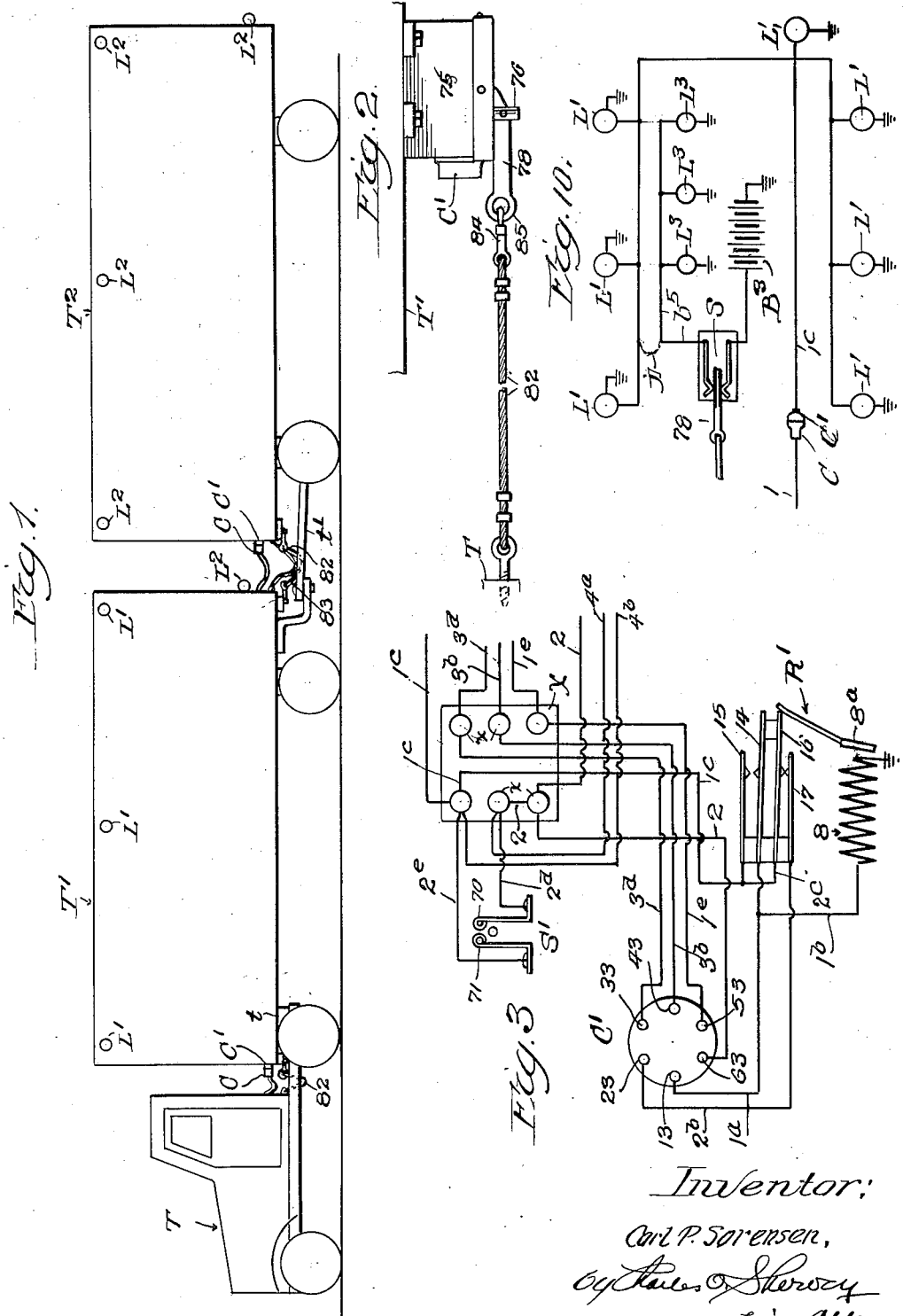
Inventor:
Carl P. Sorensen,
his Atty.

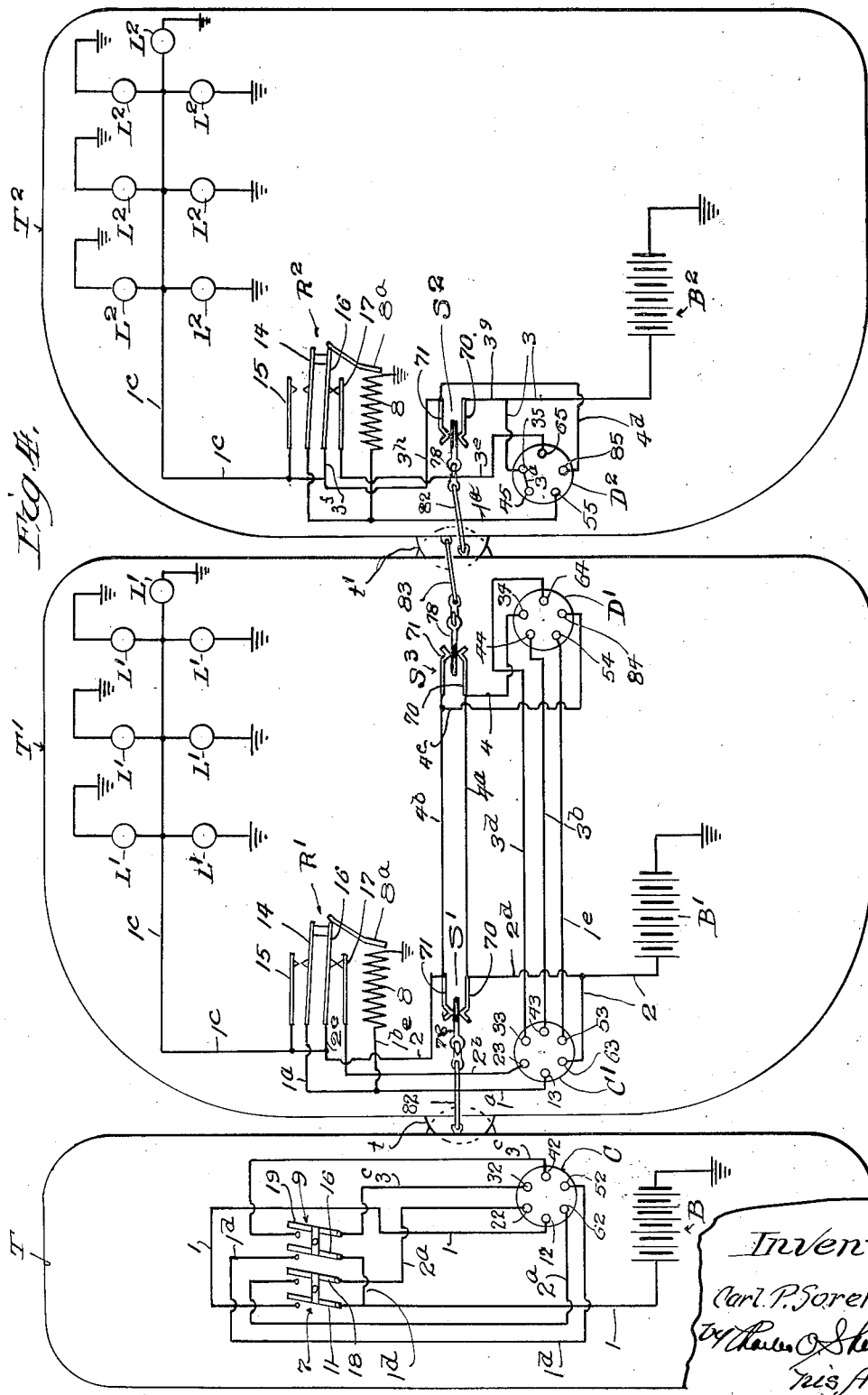

July 7, 1936.  C. P. SORENSEN  2,046,976
LIGHTING SYSTEM FOR VEHICLES
Filed June 19, 1935   3 Sheets-Sheet 3
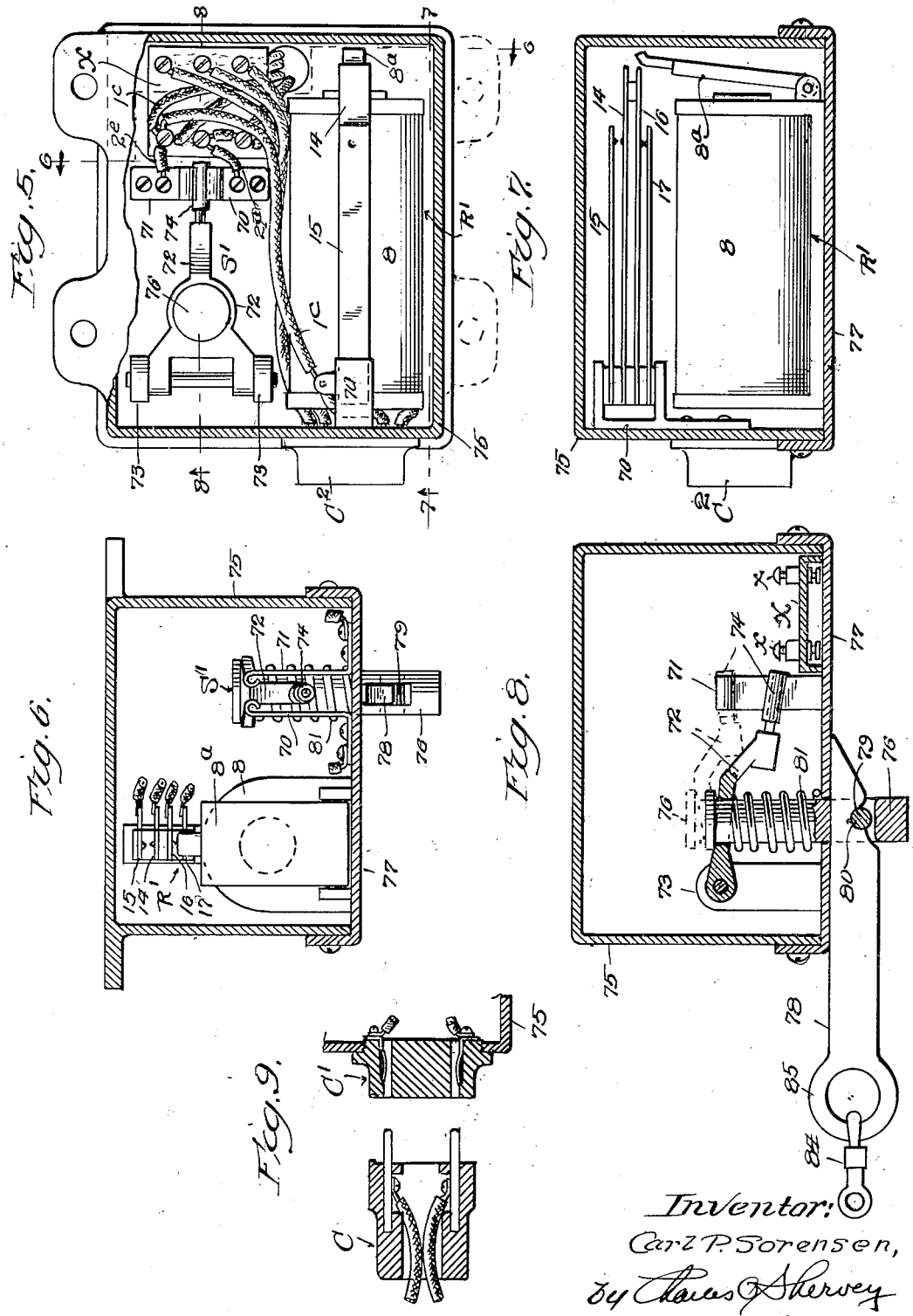
Inventor:
Carl P. Sorensen,
by Charles Hervey
his Atty.

Patented July 7, 1936

2,046,976

UNITED STATES PATENT OFFICE 2,046,976

LIGHTING SYSTEM FOR VEHICLES

Carl P. Sorensen, Chicago, Ill.

Application June 19, 1935, Serial No. 27,321

14 Claims. (Cl. 171—97)

This invention relates to lighting systems for vehicles. One of the objects of this invention is to provide automatic means for turning on the warning lights of motor drawn trailers in the event that the usual fuse is blown or the electric battery or battery connections in the motor car become disabled, or in case the trailer or trailers should accidentally become disconnected from the motor car, or from each other.

It is well known that warning lights are required by law on motor vehicles and trailers. Sometimes several trailers are drawn by a motor vehicle, and in the event of the break down of the lighting system, the warning signals fail to warn the drivers of approaching vehicles and consequently many serious accidents have happened.

Another object of the present invention is to provide an auxiliary battery in each trailer, together with automatic means for connecting the battery with the lighting system of the trailer in the event of any kind of breakdown of the main battery or its electrical connection, or in case the trailers become disconnected from the motor car or from each other.

Another object is to provide an auxiliary battery in each trailer with means whereby the trailers may be intentionally disconnected from the motor vehicle or from each other without turning on the warning lights.

Another object is to provide a simple and highly efficient system of lighting which will accomplish all of the above mentioned objects.

The invention consists in a vehicle lighting system for a train of vehicles, having automatic means for connecting an auxiliary battery with the light circuit of a vehicle in the case of an emergency. It further consists in the provision of a breakaway switch for the auxiliary battery connected to and actuated by a second vehicle, whereby in case of accidental disconnection between the two vehicles the auxiliary battery automatically will be connected to the lamp circuit or to an auxiliary lamp circuit.

The invention further consists of automatic means whereby the lighting systems of two or more trailers are automatically controlled in case of an emergency.

The invention further consists of the several novel features hereinafter fully set forth and claimed.

The invention is clearly illustrated in the drawings accompanying this specification, in which:

Fig. 1 is a diagrammatic view in side elevation of a motor vehicle and two trailers equipped with a lighting system embodying a simple form of the present invention;

Fig. 2 is a detail side elevation of a cable, a key and a box for the circuit control mechanism used in the system;

Fig. 3 is a diagrammatic view of the circuit control mechanism and wiring contained in the box seen in Fig. 2;

Fig. 4 is a diagrammatic view of the various circuits of the present lighting system applied to a motor vehicle and two trailers;

Fig. 5 is a plan, with the top of the box broken away, of the circuit control mechanism seen in Fig. 3;

Fig. 6 is a vertical, cross-section taken on the line 6—6 of Fig. 5;

Fig. 7 is a vertical, longitudinal section taken on the line 7—7 of Fig. 5;

Fig. 8 is a vertical longitudinal section taken on the line 8—8 of Fig. 5;

Fig. 9 is a detail, longitudinal section through an electrical connector employed between adjacent vehicles equipped with the system; and Fig. 10 is a diagrammatic view of a modified form of one phase of the invention.

Referring to said drawings, and first to Figs. 1 to 9, inclusive, the reference character T designates a motor vehicle, such as a tractor, to which is coupled a trailer $T^1$ by a coupling $t$. $T^2$ indicates a second trailer connected to the first trailer by a coupling $t^1$. In accordance with the common practice, the trailers are equipped with electric warning lamps $L^1$, $L^2$, some of which may be arranged along both sides of the trailers and one at the rear, or they may be disposed in any required position. Fig. 4 illustrates lamps located at both sides of and at the rear of the trailers.

The tractor or motor vehicle is equipped with a storage battery B, as is customary, and the lighting system of each trailer is connected by suitable wiring to each other and to the battery of the tractor as will be presently explained.

Each trailer is equipped with an auxiliary battery, designated by $B^1$ in the first trailer and by $B^2$ in the second trailer, which batteries under ordinary circumstances, remain inactive, but in case of an emergency are cut into the lighting circuits of the trailers.

Each trailer is also equipped with circuit control mechanism (see Fig. 5) desirably comprising, among other things, a relay, designated in one trailer by $R^1$ and in the other by $R^2$, which serve to control the circuit between the main battery in the tractor and the lamps of the trailers, and between the auxilary batteries and the lamps.

A simple form of relay is illustrated in detail in Figs. 5, 6, 7, in the drawings, and in the form shown, comprises a coil 8, an armature 8ª and a jack leaf switch having four leaf contacts 14, 15, 16, 17, insulated from each other and carried by a bracket 70 mounted in a switch box 75, which is mounted upon the trailer at its forward end. When the coil 8 is de-energized, the contacts 16, 17 are closed, but when the coil is energized the armature 8ª swings the contacts, 14, 16 upward, breaking the contact between the leaf contacts 16, 17 and making contact between the leaf contacts 14, 15. The circuits controlled by the jack leaf switch will be described later on in the specification.

The circuit control mechanism of each trailer is also provided with a "break away" switch, the one in the trailer T¹ being designated by the character S¹ and the one in the trailer T² being designated by the character S². The break away switch is desirably contained in the box 75 and, as shown, comprises a pair of contacts 70, 71 mounted in the box and means for making electrical contact therebetween, here shown as an arm 72, fulcrumed on posts 73. The arm 72 is provided with a finger 74 composed of conducting material, insulated away from the arm 72 and arranged to be moved into contact between the contacts 70, 71 to make contact therebetween. Normally the finger 74 is out of contact with the contacts 70, 71, so that the circuit running through the contacts 70, 71 is normally open at this place.

The arm 72 is held in its inactive position by a headed stem 76, which extends through the arm 72, and down through the bottom 77 of the box 75, and a key 78 which is inserted between the stem 76 and bottom of the box and serves to hold the stem and arm down. Desirably the stem may be slotted and the key may be inserted through the slot between the bottom of the box and a small pin 79 that extends transversely across the lot. The end of the key 78 may be tapered, as shown, to facilitate insertion thereof, and it is provided with a notch 80 on its lower edge which engages with the pin 79 whereby to prevent accidental disengagement between the key and stem 76. A coiled spring 81 interposed between the bottom of the box and arm 72 serves to swing the arm upwards and make contact between the contacts 70, 71 whenever the key 78 is withdrawn, either accidentally or intentionally. In Fig. 3 the wiring of the break away switch is illustrated diagrammatically in detail. For convenience in making connections, a terminal block X of insulating material is used and most of the wiring connections are made through binding posts $x$ as shown. The stem 76 is rotatable, which permits it to turn with the key in case the key is turned by any sidewise pull on the cable.

The key of each break away switch is connected to the vehicle ahead of the one on which the switch is mounted, as by a cable or other flexible connector 82, so that in case a trailer breaks away from the vehicle to which it is coupled, the key 78 will be withdrawn from the stem 76 thereby permitting the spring 81 to raise the arm 72 and close contact between the contacts 70, 71. The contacts 70, 71 control the circuit between the auxiliary battery in the trailer and the warning lamps thereof, so that whenever the contacts 70, 71 are closed, the circuit from the auxiliary battery to the lamp will be closed.

The trailer T¹ is also provided with a break-away switch S³ at its rear end, similar to the break away switches S¹, S², and the key 78 of said switch is connected to the front end of the rear trailer by a cable or flexible connection 83. The purpose of the break away switch S³ will be presently explained.

In order that the vehicles may be disconnected from each other without turning on the warning lights thereof, each cable 82 and 83 is provided with a hook 84 which hooks into an eye 85 of the key 78. By detaching the hook 84 from the key 78, the key will remain in place, thereby holding the contacts of the break away switch open whenever it is desired to intentionally uncouple the vehicles, for instance, when it is desired to leave one of the trailers at some station for the purpose of loading or unloading it, or for any other purpose.

The wiring systems of the tractor and each trailer are provided with electrical connectors, desirably of the plug and socket type, whereby electrical connections can be readily made between the tractor and first trailer and between the several trailers. The companion members of the electrical connectors are designated by the reference characters C, C¹ and D¹, D² in Fig. 4. They are shown detached from each other, but in actual practice the two members of each connector are coupled so as to continue the circuit from one vehicle to the other.

Desirably the wires that run from one vehicle to another are grouped in the nature of an extension cord. If desired, the plug members C of the connectors may be attached to the extension cords. Sufficient slack should be permitted in the extension cords and also in the cables that are attached to the keys, to permit the vehicles to turn freely with respect to each other without any danger of disconnection between the electrical connectors, and between the keys and break away switches.

I shall now proceed to describe the wiring system and circuits and explain the operation of the system.

Referring to Fig. 4, it will be seen that one end of each battery is grounded. From the other side of the battery B an electrical conductor 1 runs to one end of an arm 11 of a double pole switch 7, located in convenient position in the cab of the tractor. From the other end of the arm 11, the conductor 1 runs to the prong 12 of the connector member C. The prong 12 contacts with the contact piece 13 of the connector member C¹ and from said contact piece 13, a conductor 1ª runs, through a branch connector 1ᵇ, to the coil 8 of the relay R¹, which is grounded. When the switch 7 is closed, the coil 8 is energized and the leaf contacts 14, 15 are held closed and the leaf contacts 16, 17 are held open. The conductor 1ª continues from its junction with the branch 1ᵇ to the leaf contact 14 and from the leaf contact 15 a conductor 1ᶜ runs to the lamps L¹ which are grounded. The circuit from the battery B to the lamps L¹ may be readily traced through the connections just described. When the switch 7 is closed the lamps of the first trailer are illuminated under normal conditions.

When two trailers are used, a second double pole switch 9 is employed. A branch conductor 1ᵈ runs from the conductor 1 to one end of the arm 16 of the double pole switch 9. From the other end of arm 16 conductor 1ᵈ runs to the prong 52 of the connector member C and said prong contacts with the contact piece 53 of the connector member $C^1$. From the contact piece 53, a conductor $1^e$ runs to the prong 54 of the connector member $D^1$. The prong 54 contacts with the contact piece 55 of the connector member $D^2$ on the second trailer and from said contact piece 55 runs a connector $1^a$ which connects with the coil 8 of the relay $R^2$ of the second trailer and also connects with the leaf contact 14. As has been described in connection with the first trailer, the conductor $1^c$ runs from the leaf contact 15 to the lamps $L^2$, which are grounded. With the switch 9 closed, it is apparent that the circuit for the lamps $L^2$ is closed and the lamps are illuminated under normal conditions.

Supplemental circuits are provided whereby the lamps will be illuminated in case the main battery B, its battery connections or the usual lighting fuse becomes disabled. These circuits will now be described.

First with respect to the first trailer, an electrical conductor 2 leads from the auxiliary battery $B^1$ to the contact piece 63 of the connector member $C^1$. The contact piece 63 makes contact with the prong 62 of the connector member C and from said prong runs a connector $2^a$ which leads to one end of an arm 18 of the double pole switch 7. From the other end of arm 18 the conductor $2^a$ runs to the prong 22 of the connector member C. The prong 22 contacts with the contact piece 23 of the connector member 21 and from the contact piece 23 a conductor $2^b$ runs to the leaf contact 17. When the battery B is disabled, the coil 8 is de-energized and consequently the leaf contacts 16, 17 are closed. The circuit from the leaf contacts 16, 17 is continued through the branch conductor $2^c$ to the conductor $1^c$ which leads to the lamps $L^1$.

The supplemental wiring connections for the second trailer comprise an electrical conductor 3 which leads from the auxiliary battery $B^2$ to the contact piece 35 of the connector member $D^2$. A short connector $3^a$ runs from the contact piece 35 to the contact piece 45 of the connector member $D^2$. The contact piece 45 makes contact with the prong 44 of the connector member $D^1$. From the prong 44, a connector $3^b$ runs to the contact piece 43 of the connector member $C^1$. The contact piece 43 makes contact with the prong 42 of the connector member C and from the prong 42 a connector $3^c$ runs to one end of the arm 19 of the double pole switch 9. From the other end of said arm 19 a conductor $3^c$ runs to the prong 32 of the connector member C and said prong makes contact with the contact piece 33 of the connector member $C^1$. From the contact piece 33, a connector $3^d$ runs to the prong 64 of the connector member $D^1$. The prong 64 makes contact with the contact piece 65 of the connector member $D^2$ and from said contact piece 65 a connector $3^e$ runs to the leaf contact 17 of the relay $R^2$. The circuit to the lamps $L^2$ is continued through leaf contact 16, branch conductor $3^f$ and the main conductor $1^c$.

From the above it is readily apparent that in case the main battery becomes disabled, the lamps of both cars will be instantly illuminated through supplemental circuits running from the auxiliary batteries.

In the event that the two trailers become uncoupled from the tractor, and the connector members C, $C^1$ become disconnected, and the key 78 becomes disengaged from the stem 76 of the break away switch, the coils 8 of the relays become de-energized and circuits are established from the auxiliary batteries through the lamps of the trailers.

The wiring connections for the auxiliary lighting circuits will now be described.

The connector 2, which runs from the auxiliary battery $B^1$ on the trailer $T^1$, has a branch $2^d$ which runs to the contact 70 of the break away switch $S^1$. The key 78 having been withdrawn (assuming that the trailers have broken away from the tractor and also broken away from each other) contact is made between the two contacts 70, 71. From the contact 71, a connector $2^e$ runs to the main conductor $1^c$ that leads to the lamps $L^1$. Similarly on the trailer $T^2$, a branch $3^g$ leads from the conductor 3 and runs to the contact 70 of the breakaway switch $S^2$ thereon and from the contact 71, a conductor $3^h$ runs to the main conductor $1^c$ that leads to the lamps $L^2$. From this it is apparent that in case the trailers break away from the tractor and one trailer breaks away from another the auxiliary circuits will be closed through the break away switches and lamps light instantly, upon the happening of the emergency.

A circuit is provided for energizing the warning lamps in case both trailers break away from the tractor, but remain coupled to each other. As shown, this circuit comprises among other things the electrical connection 3 of the battery $B^2$ of the trailer $T^2$ and contact piece 35 of the connector member $D^2$. The contact piece 35 contacts with the prong 34 of the connector member $D^1$ and from said prong 34 a connector 4 runs to one contact 70 of the break away switch $S^3$. So long as the trailers remain coupled together, the break away switch $S^3$ is held open. The conductor 4 continues from the break away switch as at $4^a$ and runs to the contact 70 of the break away switch $S^1$. In case the trailer $T^1$ has broken away from the tractor T, the break away switch $S^1$ is closed. The circuit, now being described, then passes through the contacts 70, 71 of the break away switch $S^1$. From the contact 71, of the break away switch $S^1$, a conductor $4^b$ runs to the contact 71 of the break away switch $S^3$ and the branch $4^c$ runs to the prong 84 of the connector member $D^1$. The prong 84 contacts with the contact piece 85 of the connector member $D^2$ and a conductor $4^d$ runs from the contact piece 85 to the contact 71 of the break away switch $S^2$ where it joins with the conductor $3^h$ that leads to the main conductor $1^c$ that runs to the lamps $L^2$. From this it will be seen that although the break away switch $S^1$ may be closed and the break away switches $S^2$, $S^3$ open, a circuit is provided from the auxiliary battery $B^2$ to the lamps $L^2$.

In case the trailer $T^2$ breaks away from the trailer $T^1$, both break away switches $S^2$, $S^3$ are closed and the lamps $L^2$ on the trailer $T^2$ are energized from the battery $B^2$ through the auxiliary circuit which runs through the break away switch $S^2$.

When it is desired to uncouple the trailers from each other and/or from the tractor, the cables 82, 83 are detached from the keys 78, thereby leaving the break away switches open. With the trailers uncoupled from the tractor, the main light circuit is open at the connector members C, $C^1$ D, $D^1$ and as a consequence the relays are de-energized, but on account of the break away switches being open the auxiliary circuits between the auxiliary batteries and the lamps are open at the break away switches.

From this it will be seen that the various vehicles may be intentionally uncoupled from each other without turning on any of the warning lamps.

In the modified form of the invention illustrated in Fig. 10, the relay is omitted, but a break away switch S, similar to the break away switches heretofore described, is employed on the trailer. In this form of the invention the main line $1^c$, from the battery in the tractor, runs to the lamps $L^1$. From an auxiliary battery $B^3$ an auxiliary light circuit $b^5$ runs through the break away switch S to an auxiliary set of warning lamps $L^3$, or through the jumper $j$ to lamps $L^1$. This arrangement of the lighting system is applied to a trailer as in the preferred form, and the key 78 of the break away switch is connected to the tractor by a flexible cable, as has heretofore been described.

In this form of the invention the main warning lamps $L^1$ are energized directly from the main battery in the tractor, and in case the trailer breaks away from the tractor, the key 78 is withdrawn, thereby permitting the break away switch S to close the auxiliary circuit between the battery $B^3$ and the auxiliary warning lights $L^3$.

More or less variation of the exact details of construction is possible without departing from the spirit of this invention. I desire, therefore, not to limit myself to the exact form of the construction shown and described, but intend, in the following claims, to point out all of the invention disclosed therein.

I claim as new and desire to secure by Letters Patent:

1. A lighting system for trailers of trains of vehicles, comprising in combination, a main light circuit, including a battery located on the tractor of the train, an electric conductor located partly on the tractor and partly on the trailer, and lamps located on the trailer, an auxiliary battery located on the trailer, normally open auxiliary electrical connections between the auxiliary battery and said main electrical conductor, and a break away switch at said break in the auxiliary connections.

2. A lighting system for trailers of trains of vehicles, comprising in combination, a main light circuit, including a battery located on the tractor of the train, an electric conductor located partly on the tractor and partly on the trailer, and lamps located on the trailer, an auxiliary battery located on the trailer, normally open auxiliary electrical connections between the auxiliary battery and said main electrical conductor, a normally open switch at said break in the auxiliary electrical connections, means to close said switch, and means coacting therewith to permit the switch to remain open, said last mentioned means being connected to an adjacent vehicle.

3. A lighting system for trailers in trains of vehicles, comprising in combination, a main light circuit, including a battery located on the tractor of the train, electrical conductors located partly on the tractor and partly on the trailer, and lamps located on the trailer, a relay located on the trailer, said relay having one pair of contacts held closed, and another pair open when the relay is energized, a relay circuit for energizing the coil of the relay, one of said electrical conductors running to one of the contacts of the closed pair, and another of said electrical conductors running from the other of said closed contacts to the lamps, an auxiliary battery located on the trailer, an auxiliary electrical connection running from the auxiliary battery to the second named electrical connector, said auxiliary electrical connection having a normally open break therein, and a break away switch interposed in said break.

4. A lighting system for trailers in trains of vehicles, comprising in combination, a main light circuit, including a battery located on the tractor of the train, electrical conductors located partly on the tractor and partly on the trailer, and lamps located on the trailer, a relay located on the trailer, said relay having one pair of contacts that are held closed and another pair open when the relay is energized, a relay circuit for energizing the coil of the relay, one of said electrical conductors running to one of the said closed contacts, and another conductor running from the other of said closed contacts to the lamps, an auxiliary battery located on the trailer, a conductor leading therefrom through a break away switch to the lamps, and a means operable upon disconnection between the tractor and trailer to close the auxiliary circuit through the break away switch.

5. In a lighting system for a trailer of a train of vehicles, a break away switch mounted on the trailer, an auxiliary lamp circuit running through said break away switch, a detachable key operating to maintain the contacts in open condition, and a flexible connection detachably connected to the key and attached to an adjacent vehicle.

6. In a lighting system for trailers, a break away switch comprising a pair of contacts, a spring actuated movable arm for opening and closing said contacts, a stem engaging said arm and operating when in one position to hold the arm out of engagement with the contacts, a key engaging said stem and operating to hold the arm in said position, and a flexible connection connecting said key with the next adjacent vehicle.

7. A lighting system for a train of vehicles, comprising a main lighting circuit, including a battery on one of the vehicles, electrical conductors, located partly on each vehicle, and lamps located on the trailing vehicles, and auxiliary lighting circuits, one located on each trailing vehicle, each said auxiliary circuit having a break away switch therein connected to and operated by an adjacent vehicle.

8. A lighting system for a trailer of a train of vehicles, comprising a main lighting circuit, including a battery on the tractor of the train, electrical conductors located partly on the tractor and partly on the trailer, and lamps located on the trailer, an auxiliary lighting circuit on the trailer, said auxiliary circuit having a break therein, and a break away switch interposed in said break, connected to and operated by an adjacent vehicle.

9. A lighting system for a trailer of a train of vehicles, comprising a main lighting circuit, including a battery on the tractor of the train, electrical conductors located partly on the tractor and partly on the trailer, and lamps located on the trailer, a relay circuit and relay on the trailer for closing and opening a break in said main lighting circuit, an auxiliary lighting circuit located on the trailer, said auxiliary circuit having a break therein, a break away switch interposed in said break, and means for actuating said switch operatively connected to an adjacent vehicle.

10. A lighting system for a trailer, comprising in combination a main lighting circuit for the trailer, having its source of electricity located on an attached tractor, an auxiliary lighting circuit on the trailer, having its source of electricity on the trailer and a break in its circuit, and a break away switch interposed in said break.

11. A lighting system for a trailer of a train of vehicles, comprising a main lighting circuit, including a source of electrical supply located on the tractor of the train, electrical conductors located partly on the tractor and partly on the trailer, and lamps located on the trailer, a normally open auxiliary lighting circuit on the trailer, including a battery and a breakaway switch for normally holding said auxiliary lighting circuit open, a normally open supplemental lighting circuit, a relay circuit, including a relay having contacts in the main lighting circuit that are closed when the relay is energized, and contacts in the supplemental lighting circuit that are held open when the relay is energized, whereby, when the main lighting circuit is broken and the relay is deenergized, the circuit through the supplemental circuit is closed.

12. A lighting system for trailers of a train of vehicles, comprising a main source of electrical supply located on the trailer and individual circuits for the several trailers, said circuits running from said source of electrical supply, and there being a switch in each circuit whereby the circuit for the last trailer only may be closed, a normally open auxiliary lighting circuit on each trailer, including a battery and a breakaway switch in each auxiliary lighting circuit, and a normally open supplemental lighting circuit on an intermediate trailer having a breakaway switch therein controlled by the next adjacent rear trailer.

13. A lighting system for trailers of a train of vehicles, comprising main lighting circuits, one for each trailer and each circuit including a source of electrical supply located on the tractor of the train, electrical conductors located partly on the tractor and partly on the trailers, and lamps located on the trailers, a relay circuit, and a relay on each trailer for closing and opening a break in said main lighting circuit in each trailer, an auxiliary lighting circuit located on each trailer, a breakaway switch on each trailer, interposed in the auxiliary lighting circuit thereof and controlled by an adjacent vehicle.

14. A lighting system for trailers of a train of vehicles, comprising a main source of electrical supply located on the tractor, individual light circuits one for each trailer running from said main source of electrical supply, auxiliary light circuits for each trailer, including a battery on each trailer, relay circuits, each including a relay on each trailer and each relay having contacts for closing a break in the main light circuit on its trailer and opening contacts in the auxiliary light circuit on its trailer when energized, a breakaway switch on each auxiliary circuit, and circuit connections between the battery of an intermediate vehicle and the adjacent rearward one, whereby the battery of an intermediate trailer energizes the light circuit of a rearward trailer when the main source of electrical supply becomes disabled.

CARL P. SORENSEN.